(12) United States Patent
Huang et al.

(10) Patent No.: US 10,601,190 B2
(45) Date of Patent: Mar. 24, 2020

(54) CONNECTION SEAT AND CONNECTION STRUCTURE FOR COAXIAL CABLE

(71) Applicant: PEGATRON CORPORATION, Taipei (TW)

(72) Inventors: Song-Yuan Huang, Taipei (TW); Wei-Chun Tsao, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 16/395,381

(22) Filed: Apr. 26, 2019

(65) Prior Publication Data

US 2019/0356092 A1 Nov. 21, 2019

(30) Foreign Application Priority Data

May 15, 2018 (TW) .............................. 107116485 A (51) Int. Cl.
| | |
|---|---|
| *H01R 24/50* | (2011.01) |
| *H01R 13/504* | (2006.01) |
| *H01R 9/05* | (2006.01) |
| *H01R 24/38* | (2011.01) |
| *H01B 11/18* | (2006.01) |
| *H01R 43/04* | (2006.01) |
| *H01R 43/20* | (2006.01) |
| *H01R 24/52* | (2011.01) |
| *H02G 15/00* | (2006.01) |

(52) U.S. Cl.
CPC ......... *H01R 24/50* (2013.01); *H01B 11/1808* (2013.01); *H01R 9/05* (2013.01); *H01R 13/5045* (2013.01); *H01R 24/52* (2013.01); *H01R 43/04* (2013.01); *H01R 43/205* (2013.01); *H02G 15/00* (2013.01); *H01R 24/38* (2013.01)

(58) Field of Classification Search
CPC ...... H01R 24/50; H01R 9/05; H01R 13/5045; H01R 24/52; H01R 43/04; H01R 43/205; H01R 24/38; H02G 15/00; H02G 15/025
See application file for complete search history.

(56) References Cited

U.S. PATENT DOCUMENTS

| | | | |
|---|---|---|---|
| 6,739,907 B2 * | 5/2004 | Kuroda .................. | H01R 4/023 439/582 |
| 2008/0293299 A1 * | 11/2008 | Liao ...................... | H01R 9/0515 439/582 |
| 2013/0280948 A1 * | 10/2013 | Tsuchida ................ | H01R 13/62 439/372 |

* cited by examiner

*Primary Examiner* — Amy Cohen Johnson
*Assistant Examiner* — Paul D Baillargeon
(74) *Attorney, Agent, or Firm* — McClure, Qualey & Rodack, LLP (57) ABSTRACT

A connection seat includes a base including a top plate and a pedestal connected to each other, a metal member including a body and at least one grounding end, a press cover including a protruding portion, and a flexible concatenation portion connecting the base and the press cover. The base further includes a first trench located on the top plate, a second trench located between the top plate and the pedestal, and a through-hole running through the top plate and the pedestal. A coaxial cable can extend into the base along the first trench, to be detachably mounted to the base. The body extends into the second trench to engage the metal member with the base, and the grounding end extends out of the pedestal. When the concatenation portion is bent such that the press cover covers the top plate, the protruding portion correspondingly protrudes toward the through-hole.

20 Claims, 11 Drawing Sheets

CONNECTION SEAT AND CONNECTION STRUCTURE FOR COAXIAL CABLE

CROSS-REFERENCE TO RELATED APPLICATION

This non-provisional application claims priority under 35 U.S.C. § 119(a) to Patent Application No. 107116485 filed in Taiwan, R.O.C. on May 15, 2018, the entire contents of which are hereby incorporated by reference.

BACKGROUND

Technical Field

This disclosure relates to a connection seat and connection structure for a coaxial cable, in particularly, to a connection seat and connection structure of a coaxial cable integrating a joint and a joint seat.

Related Art

A coaxial cable including a peripheral shielding layer is applicable to transmitting a high-frequency signal such as a radio frequency (RF) signal, to avoid electromagnetic interference and enhance signal transmission stability. Therefore, coaxial cables are widely applied to various network communications fields of a mobile phone, a television, satellite communications, antenna communications, closed-circuit television (CCTV), wireless communications, and the like.

To connect a coaxial cable to a circuit board, the coaxial cable and a joint are assembled in a crimped manner to form a connector (such as I-PEX MHF series). Then, the connector is fastened to a joint seat on the circuit board. When connection is not needed, the connector may be removed from the joint seat. However, a defect in a procedure of assembling the coaxial cable and the joint may affect accuracy of such a connector. In addition, in processes of repeatedly unfastening and fastening the connector and the joint seat, a latch of the connector is likely to be loosened and broken, further resulting in separation or poor contact between the coaxial cable and its joint. Therefore, according to the connector, signal transmission stability may be degraded when the connector is connected to a coaxial cable, and replacement rates of a corresponding coaxial cable and its joint or joint seat materials are increased. Consequently, time, metal efforts, and economic costs for checking a defect and replacing a material are increased.

SUMMARY

To resolve the foregoing problem, a connection seat for connecting a coaxial cable is provided according to an embodiment of this disclosure. The connection seat includes a base, a metal member, a press cover, and a concatenation portion. The base includes a top plate, a first trench that located on the top plate and that extending along a first direction, a second trench below the top plate, a pedestal that below the second trench and connected to the top plate, and a through-hole running through the top plate and the pedestal. The first trench and the second trench respectively extend to a first lateral surface of the base for enabling the coaxial cable to extend from the first lateral surface along the first trench into the base to be detachably mounted to the base. The metal member includes a body and at least one grounding end. At least one part of the body extends from the first lateral surface into the second trench to engage the metal member with the base, and the at least one grounding end extends out of the pedestal from the body. The press cover includes a protruding portion. The concatenation portion is flexible and connects the base and the press cover. In this connection seat, when the concatenation portion is bent such that the press cover covers the top plate of the base, the protruding portion correspondingly protrudes toward the through-hole.

According to another embodiment of this disclosure, a connection structure for connecting a coaxial cable is provided, including: a circuit board; and the connection seat as described above, where the connection seat is welded to the circuit board through the at least one grounding end.

According to still another embodiment of this disclosure, a connection structure for connecting a coaxial cable is provided, including: a circuit board; the connection seat as described above, where the connection seat is welded to the circuit board through the at least one grounding end; and a coaxial cable. The coaxial cable extends from the first lateral surface along the first trench into the connection seat to be detachably mounted to the connection seat. In the connection structure, a central conductor inside at least one section of an endpoint of the coaxial cable extending into the first trench is exposed. When the coaxial cable is clamped and positioned by the press cover and the base, and the protruding portion presses the central conductor, to make the central conductor in contact with the circuit board through the through-hole.

According to the connection seat and the connection structure provided by the embodiments of this disclosure, a coaxial cable can be assembled and disassembled conveniently according to requirements, and in addition, a breakage rate of the coaxial cable or its corresponding connection seat in assembly and disassembly processes can be reduced. Therefore, stability of signal transmission using the coaxial cable can be improved, and time, metal efforts, and economic costs that need to be consumed for replacing the coaxial cable and its corresponding connection seat are reduced.

DETAIL DESCRIPTION OF THE EMBODIMENTS

Various embodiments are described below, and a person of ordinary skill in the art can easily understand the spirit and principle of this disclosure with reference to the description in combination with drawings. However, although some specific embodiments are described herein in detail, the embodiments are merely illustrative, and none of the embodiments is considered to be limitative or exhaustive in all aspects. Therefore, it would be obvious and easy for a person of ordinary skilled in the art to arrive at various variations and modifications of this disclosure without departing from the spirit and principle of this disclosure.

Figure 1A:
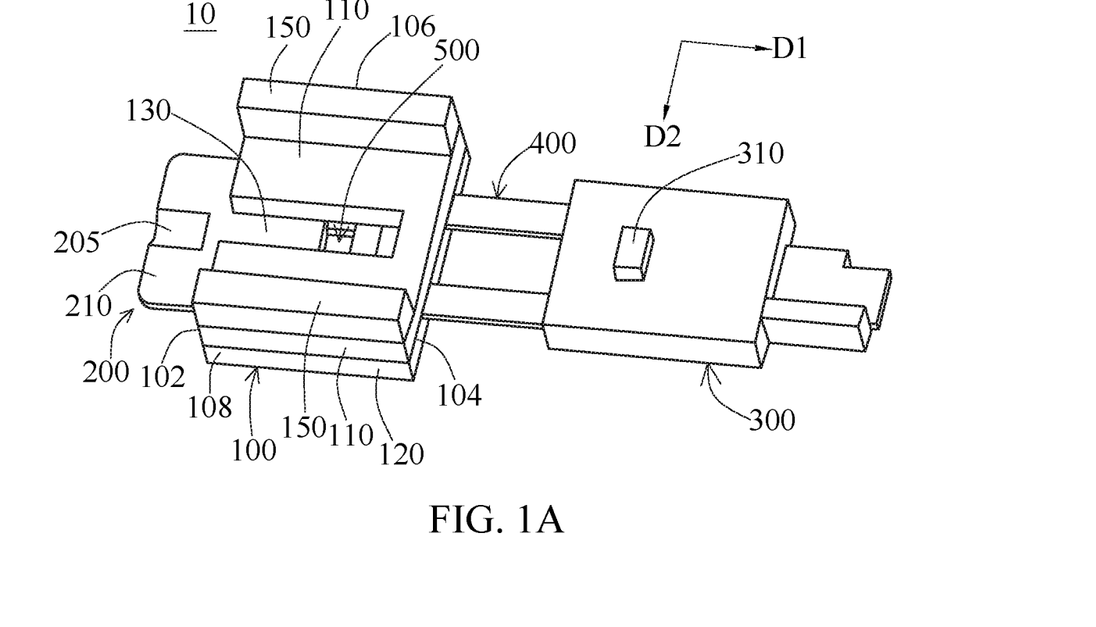
FIG. 1A is a top view of an initial state of a connection seat according to a first embodiment of this disclosure.
Figure 1B:
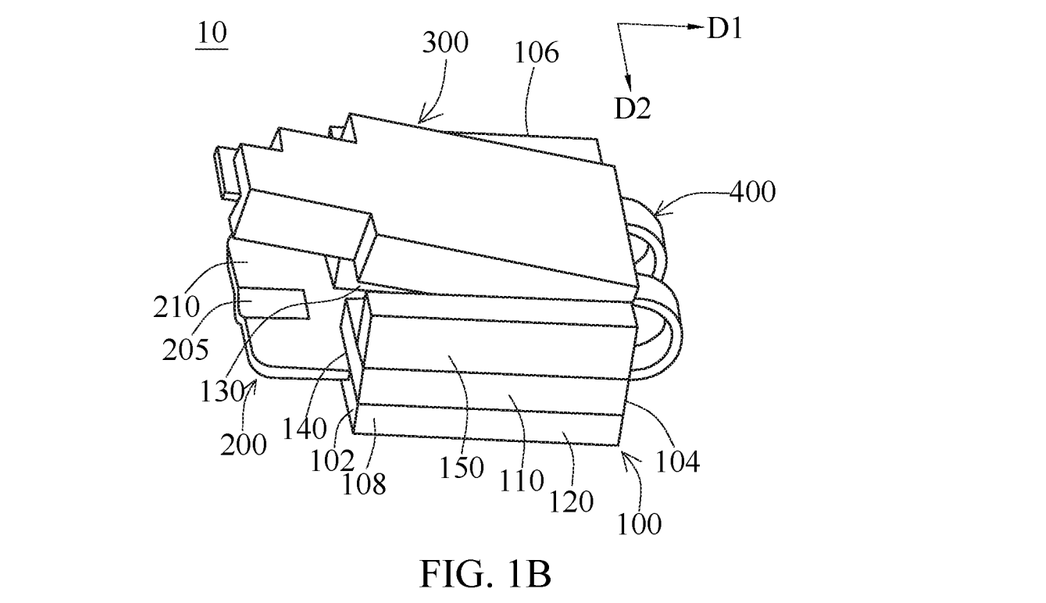
FIG. 1B is a top view of a bent state of the connection seat according to the first embodiment of this disclosure.
Figure 1C:
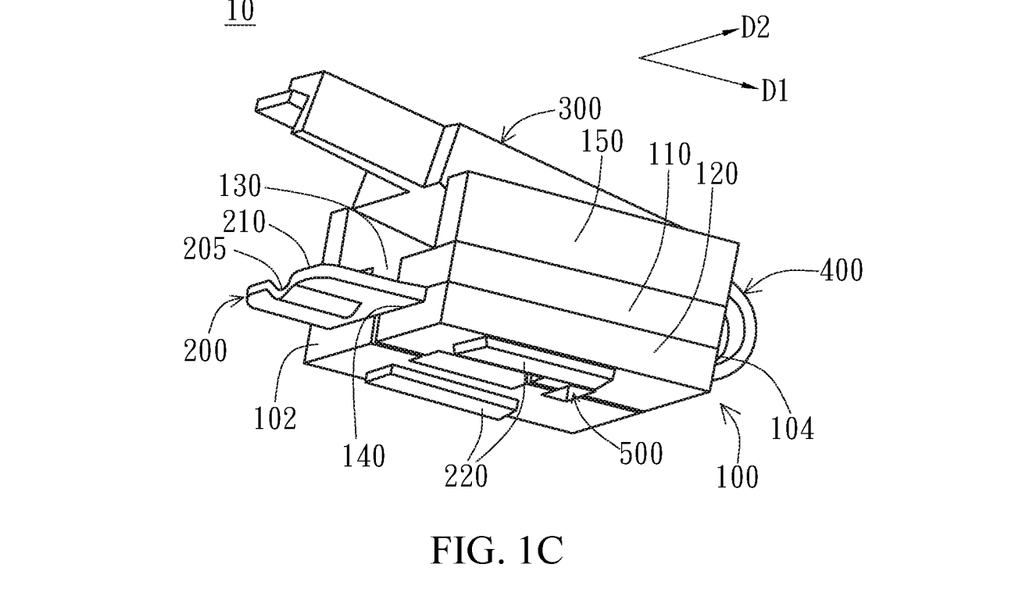
FIG. 1C is a bottom view of the connection seat according to the first embodiment of this disclosure.

A connection seat according to a first embodiment of this disclosure is described below with reference to FIG. 1A to FIG. 1C. FIG. 1A is a top view of an initial state of a connection seat according to a first embodiment of this disclosure. FIG. 1B is a top view of a bent state of the connection seat according to the first embodiment of this disclosure. FIG. 1C is a bottom view of the connection seat according to the first embodiment of this disclosure.

In view of the above, according to the first embodiment of this disclosure, a connection seat 10 for connecting a coaxial cable includes a base 100, a metal member 200 including a body 210 and at least one grounding end 220 (shown in FIG. 1C), a press cover 300 including a protruding portion 310, and a concatenation portion 400 connecting the base 100 and the press cover 300.

Specifically, in the connection seat 10 for a coaxial cable, the base 100 has a top plate 110 that is relatively directed upward, a first trench 130 that is located on the top plate 110 and that extends along a first direction D1, a second trench 140 (shown in FIG. 1B and FIG. 1C) below the top plate 110, a pedestal 120 that is below the second trench 140 and that is connected to the top plate 110, and a through-hole 500 running through the top plate 110 and the pedestal 120. Specifically, the long-strip-shaped first trench 130 is formed on the top plate 110 along the first direction D1, the second trench 140 that is essentially close to a plate shape or a sheet shape is formed between the top plate 110 and the pedestal 120, and the top plate 110 and the pedestal 120 is connected to each other or be integrally formed. The first trench 130 and the second trench 140 separately extends to a first lateral surface 102 of the base 100 without extending to a second lateral surface 104 of the base 100. In addition, according to some embodiments of this disclosure, the first trench 130 and the second trench 140 is in communication with each other, so as to further save a material of the base 100. However, this disclosure is not limited thereto.

Herein, a forward direction of the first direction D1 is defined as a direction from the first lateral surface 102 of the base 100 toward the second lateral surface 104; and a forward direction of the second direction D2 is defined as a direction from a third side face 106 of the base 100 toward a fourth side face 108. However, the directions described herein are merely illustrated to facilitate description, and relative directivity of each component according to the embodiments of this disclosure is not limited thereto on the premise of conforming to the intention of this disclosure.

According to the foregoing structure, a coaxial cable 700 can extend from the first lateral surface 102 along the first trench 130 into the base 100 to be detachably mounted to the base 100. In addition, at least one part of the body 210 of the metal member 200 may extend from the first lateral surface 102 into the second trench 140 to engage the whole metal member 200 with the base 100. To be specific, because the base 100 is formed by connecting or integrally forming the top plate 110 that is relatively directed upward and the pedestal 120 that is relatively directed downward. The metal member 200 can relatively engage the metal member 200 with the base 100 by inserting the body 210 into the second trench 140 between the top plate 110 and the pedestal 120. In this case, according to an embodiment of this disclosure, the at least one grounding end 220 of the metal member 200 may further penetrate through the pedestal 120 from the second trench 140 inside the base 100 and extend out of the pedestal 120 from the body 210, so as to be exposed from a surface of the pedestal 120 oppositely directed to the top plate 110, for subsequent use in welding a circuit board or grounding.

However, the above is merely an example, and according to another embodiment of this disclosure, the at least one grounding end 220 may alternatively protrude from the body 210 outside the base 100 to exceed a surface of the pedestal 120 oppositely directed to the top plate 110.

Herein, the metal member 200 inserted into the base 100 does not shield the through-hole 500 of the base 100, so that the through-hole 500 is essentially a hole defined by surrounding of the base 100 or surrounding of the base 100 and the metal member 200 together. According to the first embodiment of this disclosure, referring to FIG. 1B, because the concatenation portion 400 connecting the base 100 and the press cover 300 is flexible, the concatenation portion 400 can be bent to cover the press cover 300 over the top plate 110 of the base 100. In this case, the protruding portion 310 of the press cover 300 may correspondingly protrude toward the through-hole 500 running through the base 100. For example, the protruding portion 310 may extend into the through-hole 500 correspondingly (details are described below).

To enable the press cover 300 to be correspondingly positioned on the base 100, according to the first embodiment of this disclosure, the base 100 of the connection seat 10 further includes positioning lateral walls 150 on two sides to secure or engage the press cover 300. Specifically, the base 100 includes positioning lateral walls 150 protruding and extending from the top plate 110 and oppositely directed to the second trench 140. For example, the positioning lateral walls 150 protruding from the top plate 110 are respectively disposed on two sides of the first trench 130. A shape defined by surrounding of the positioning lateral walls 150 matches with a shape of the press cover 300, to enable the positioning lateral walls 150 to be abutted against and position and engage the press cover 300 when the press cover 300 covers the top plate 110 of the base 100. However, in addition to the foregoing positioning lateral walls 150, other positioning structures or manners may be used alone or in combination in this disclosure. In addition, when the press cover 300 is engaged or secured by extending the protruding portion 310 into the through-hole 500 and engaging the protruding portion 310 with the through-hole 500 without disposing a positioning lateral wall 150 or another positioning structure. In view of the above, positioning-related structures in the drawings and description are all merely illustrative, and this disclosure is not limited thereto.

According to the first embodiment of this disclosure, the concatenation portion 400 of the connection seat 10, the press cover 300, and the base 100 are made of a same material and integrally formed. In addition, the concatenation portion 400 has a thickness less than those of the press cover 300 and the base 100 and has higher flexibility compared with the press cover 300 and the base 100. For example, the concatenation portion 400, the press cover 300, and the base 100 are made of plastic. However, according to another embodiment of this disclosure, the concatenation portion 400 of the connection seat 10 is alternatively made of a material including higher flexibility compared with the press cover 300 and the base 100, and the press cover 300 and the base 100 are made of a material the same as or different from that of the concatenation portion 400. In addition, this disclosure is not limited thereto.

The connection seat 10 according to the first embodiment of this disclosure is configured to directly connect a coaxial cable. Specifically, a coaxial cable, which has peripheral structure being removed and partially exposed, may be inserted into the first trench 130 of the base 100 with the exposed central conductor arranged corresponding to the through-hole 500. When the press cover 300 covers the base 100, the protruding portion 310 correspondingly presses the central conductor of the coaxial cable at the position of the through-hole 500 to make the coaxial cable penetrate through the through-hole 500, so as to connect the central conductor to a part that is expected to be connected to (further details are described below). Therefore, the connection seat 10 according to the first embodiment of this disclosure does not need to assembly the coaxial cable and a joint before connection. Hence, a connection process is simplified. In addition, a defect caused by poor assembly of the coaxial cable and the joint can be avoided, and a material breakage rate may be reduced when the joint and the coaxial cable are separated or displaced because the connector including the joint and the coaxial cable is repeatedly unfastened from and fastened to a joint in a connection or disassembly process.

In addition, according to the first embodiment of this disclosure, the body 210 of the metal member 200 outside the second trench 140 may further include a groove 205, and the groove 205 also extends along the first direction D1 and correspond to the first trench 130. When the coaxial cable is inserted into the first trench 130, a part of the coaxial cable extending out of the base 100 is disposed along the groove 205 to be positioned more firmly, thereby avoiding interference between structures. However, the connection seat 10 may alternatively dispose the coaxial cable relatively firmly without disposing a groove 205. In addition, this disclosure is not limited thereto.

Subsequently, the connection seats according to different embodiments of this disclosure are further described with reference to FIG. 2A and FIG. 2C.

Figure 2A:
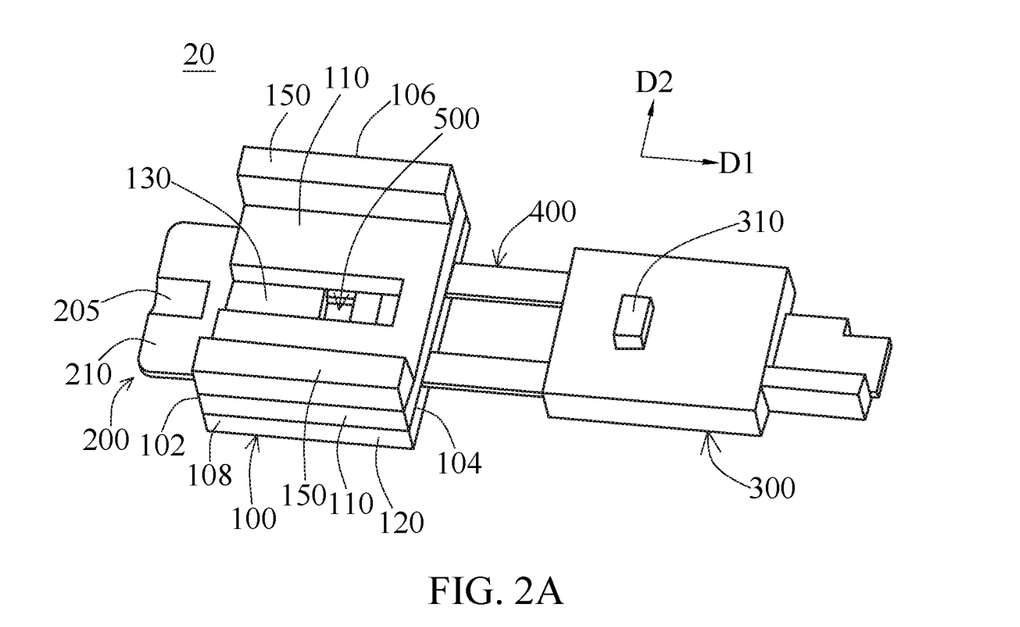
FIG. 2A is a top view of a connection seat according to a second embodiment of this disclosure.

Referring to FIG. 2A, according to a connection seat 20 of a second embodiment of this disclosure, a first trench 130 and a second trench 140 of a base 100 are not in communication with each other. To be specific, the first trench 130 does not run through a top plate 110 of the base 100, but is disposed on a part of a surface of the top plate 110, the second trench 140 is disposed below the top plate 110, and a through-hole 500 runs through the whole base 100. Hence, a defect, such as a short circuit, can be avoided. The short circuit may possibly be caused by contact between a central conductor exposed from a coaxial cable and a metal member when the coaxial cable is inserted into the first trench 130 because a position for disposing the central conductor exposed from the coaxial cable deviates from the through-hole 500.

Figure 2B:
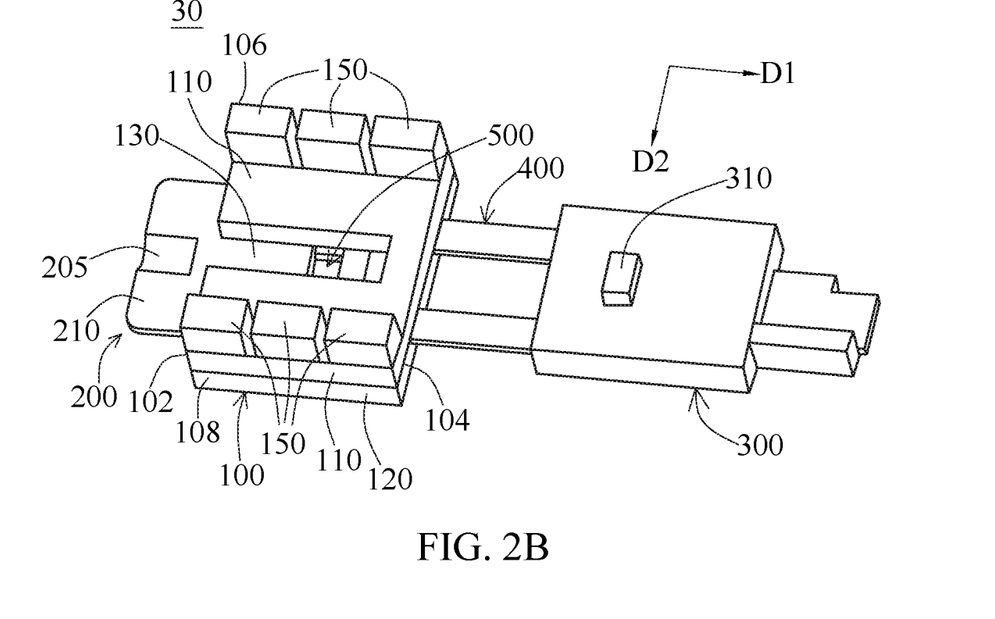
FIG. 2B is a top view of a connection seat according to a third embodiment of this disclosure.

Referring to FIG. 2B, according to a connection seat 30 of a third embodiment of this disclosure, a base 100 includes a plurality of positioning lateral walls 150 disposed on two sides of a first trench 130, so as to further enhance positioning accuracy by means of multi-point interference when a press cover 300 covers the base 100. However, the foregoing is merely illustrative description, and a quantity, shapes, and positions of the positioning lateral walls 150 are not limited to the illustration in this specification and the drawings.

Figure 2C:
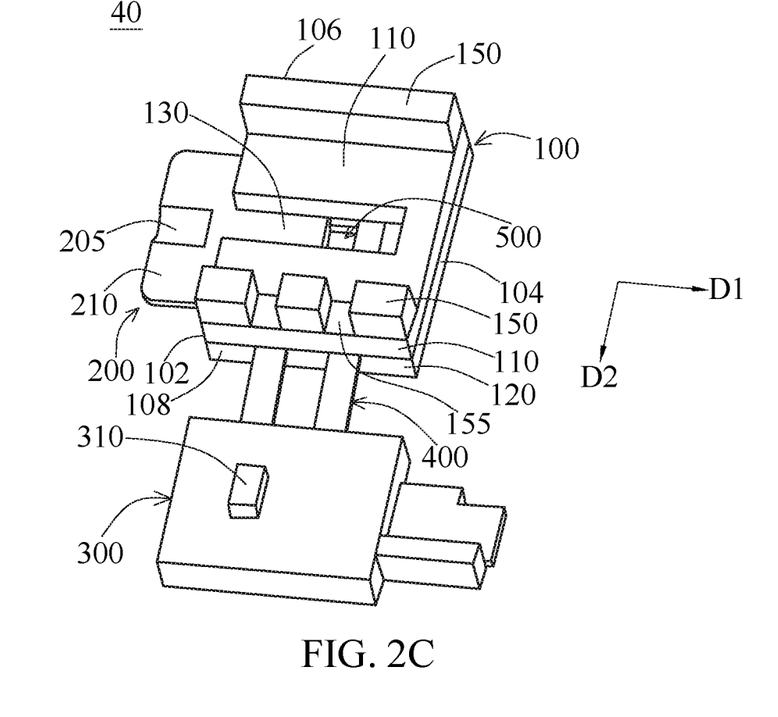
FIG. 2C is a top view of a connection seat according to a fourth embodiment of this disclosure.

Referring to FIG. 2C, according to a connection seat 40 of a fourth embodiment of this disclosure, a press cover 300 and a base 100 are connected to each other through a concatenation portion 400 outside a second lateral surface 104 of the base 100. For example, as shown in FIG. 2C, an end of the concatenation portion 400 is connected to a fourth side face 108 that is between a first lateral surface 102 and the second lateral surface 104 of the base 100 and that is relatively directed toward a second direction D2, and the other end of the concatenation portion 400 is connected to the press cover 300. In this case, if a positioning lateral wall 150 is disposed, a notch 155 that allows the concatenation portion 400 to pass through or accommodates the concatenation portion 400 when the concatenation portion 400 is bent is correspondingly disposed on the positioning lateral wall 150. To be specific, as long as the concatenation portion 400 is enabled to connect the base 100 and the press cover 300, and when the concatenation portion 400 is bent, the press cover 300 covers the base 100 and be positioned, so that a protruding portion 310 protrudes in a manner of corresponding to a through-hole 500. A configuration or a position in which the press cover 300 and the base 100 are connected to each other through the concatenation portion 400 is not limited to an aspect described in detail in this specification and drawings.

Figure 3:
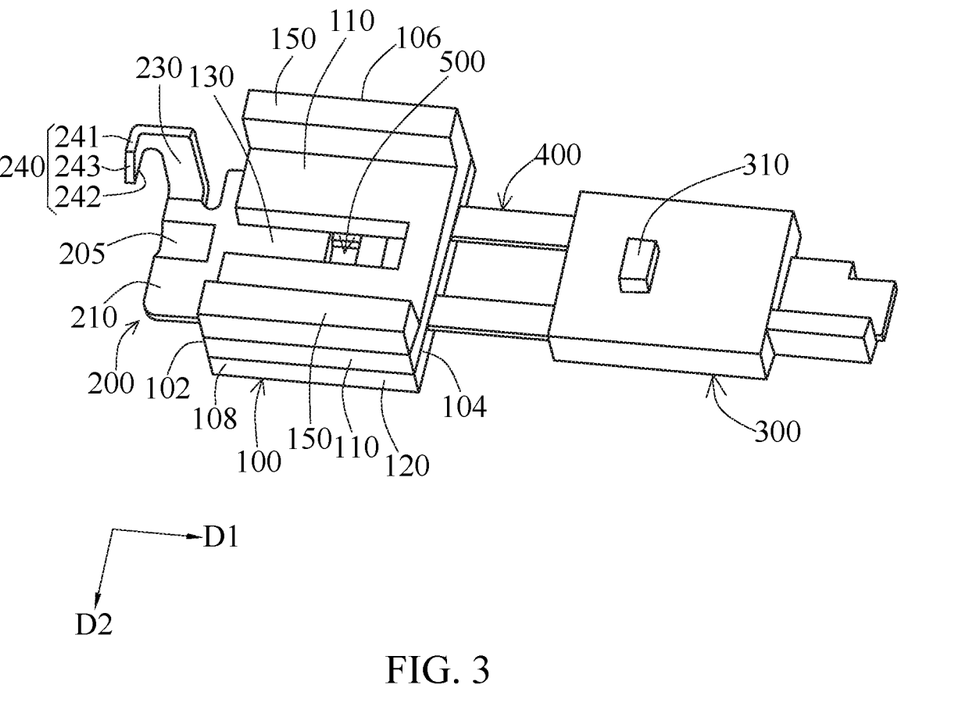
FIG. 3 is a top view of a connection seat according to a fifth embodiment of this disclosure.

Subsequently, a connection seat 50 according to a fifth embodiment of this disclosure is described by referring to FIG. 3. Specifically, the connection seat 50 differs from the connection seat 10 shown in FIG. 1A to FIG. 1C in that: the metal member 200 further includes a first extending portion 230 protruding from the body 210 and oppositely directed to the at least one grounding end 220, and a latch portion 240 protruding from the first extending portion 230. By means of such a structure, when the press cover 300 covers the top plate 110 of the base 100, the latch portion 240 latches and fixes the at least one part of the press cover 300, so that the press cover 300 is not loosened, for example, because of a factor, such as elasticity, of the concatenation portion 400.

According to different embodiments of this disclosure, the latch portion 240 may have different structures capable of securing or engaging with the press cover 300. For example, according to the fifth embodiment shown in FIG. 3, the latch portion 240 includes a first lateral edge 241 oppositely directed to the body 210, a second lateral edge 242 facing the body 210, and a third bevel edge 243 connecting the first lateral edge 241 and the second lateral edge 242. A length of the second lateral edge 242 is greater than a length of the first lateral edge 241. Therefore, the third bevel edge 243 provides a slope for guiding the press cover 300 to move downward. Hence, when the concatenation portion 400 is bent such that the press cover 300 covers the top plate 110 of the base 100, the at least one part of the press cover 300 slides along the third bevel edge 243 toward the top plate 110. Subsequently, when moving from a side of the first lateral edge 241 that is relatively short to a side of the second lateral edge 242 that is relatively long on the third bevel edge 243, the at least one part of the press cover 300 deforms significantly. Therefore, when a part of the deformed press cover 300 moves to a junction between the third bevel edge 243 and the second lateral edge 242, since the press cover 300 is not abutted against by the third bevel edge 243 of the latch portion 240, the press cover 300 recovers from deformation and rebounds to move to a position below the second lateral edge 242, so as to be further abutted against from the top to the bottom by the second lateral edge 242 to be avoided from being loosened from the base 100 (this process is described below in detail).

In view of the above, to enable the press cover 300 to be abutted against by the latch portion 240, according to a preferred embodiment of this disclosure, the press cover 300 may be made of a material including flexibility greater than that of the latch portion 240 (that is, a part of the metal member 200). However, this disclosure is not limited thereto.

In the following, a process of preparing the connection seat 50 shown in FIG. 3 according to an embodiment of this disclosure is further described by referring to FIG. 4.

According to an embodiment of this disclosure, the base 100, the concatenation portion 400, and the press cover 300 that are integrally formed and made of plastic by means of insert molding in injection molding. And the metal member 200 is additionally made of metal, such as iron, by stamping process. Subsequently, the metal member 200 is embedded into the second trench 140 of the base 100, and the at least one grounding end 220 is protruded out of the pedestal 120 of the base 100 (referring to FIG. 1A and FIG. 1C). Subsequently, in a part of the first trench 130 in which the metal member 200 is not disposed, material 100' of the base 100 corresponding to the through-hole 500 is removed, to form the through-hole 500.

Figure 4:
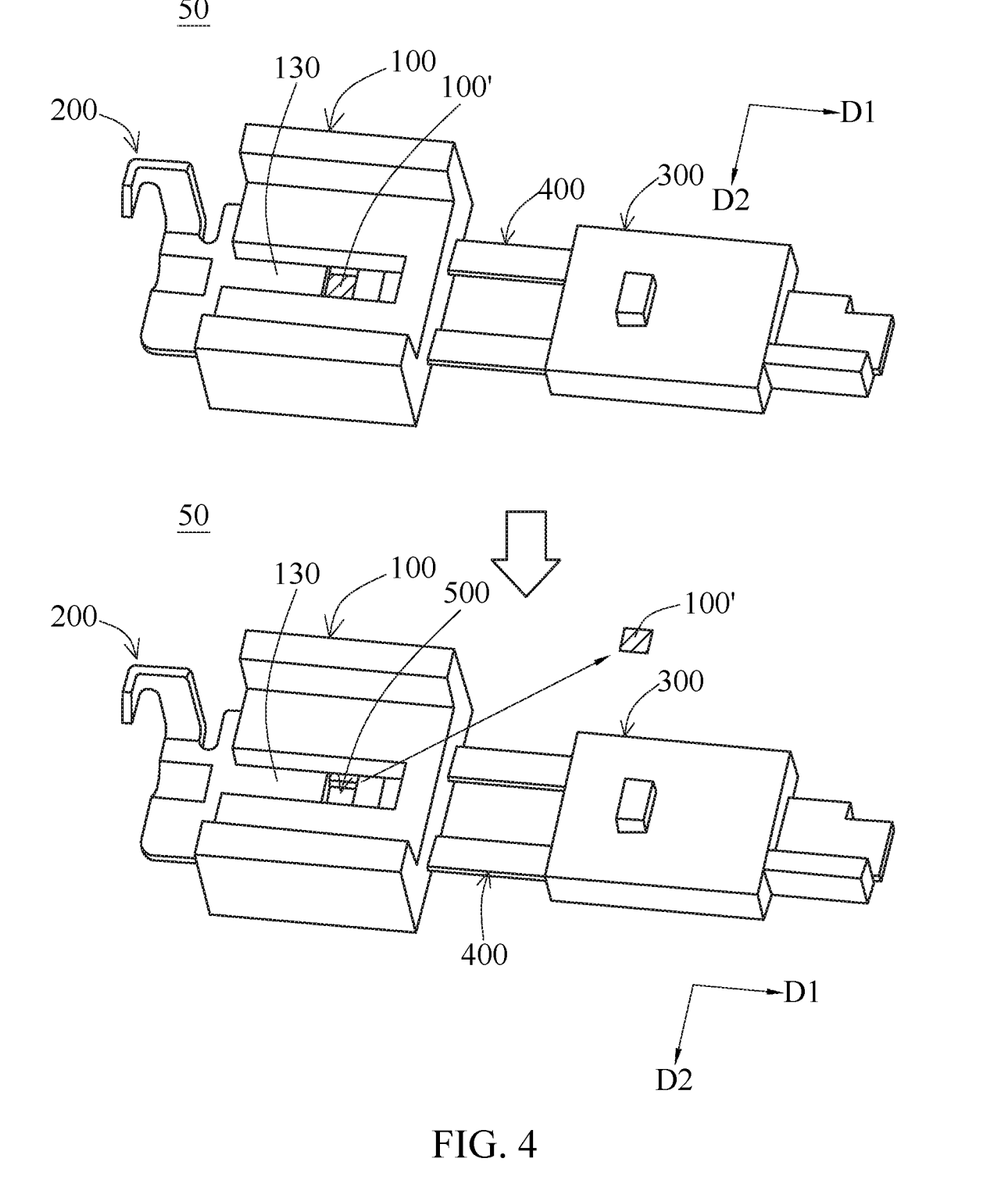
FIG. 4 is a schematic diagram of preparing the connection seat shown in FIG. 3 according to an embodiment of this disclosure.

However, the foregoing process referring to FIG. 4 is merely illustrative. For example, according to another embodiment of this disclosure, the base 100, the concatenation portion 400, and the press cover 300 may alternatively be separately formed and then, connected to each other in an engaged manner or another manner. Alternatively, according to some embodiments of this disclosure, before the base 100 and the metal member 200 are assembled, material 100' of the base 100 corresponding to the through-hole 500 is removed at first, to form the through-hole 500, and then, the metal member 200 is embedded into the base 100 for mounting in a manner of not shielding or blocking the through-hole 500. In view of the above, the connection seat 50 shown in FIG. 3 may be formed in various manners, and this disclosure is not limited to the process specifically described herein. In addition, it should be understood by a person of ordinary skill in the art that the connection seats corresponding FIG. 1A to FIG. 2C may be prepared by using a process the same as or similar to the process of preparing in FIG. 3. Details are not described herein again.

Subsequently, a connection structure 60 integrating a connection seat 50 to a circuit board 600 according to an embodiment of this disclosure is described by referring to FIG. 5A to FIG. 5C.

In view of the above, according to an embodiment of this disclosure, the connection seat is jointed to the circuit board. For example, referring to FIG. 5A, the connection seat 50 shown in FIG. 3 may be welded to the circuit board 600. However, the above is merely an example. The different connection seats according to FIG. 1A to FIG. 2C may be selectively welded to the circuit board 600.

Figure 5A:
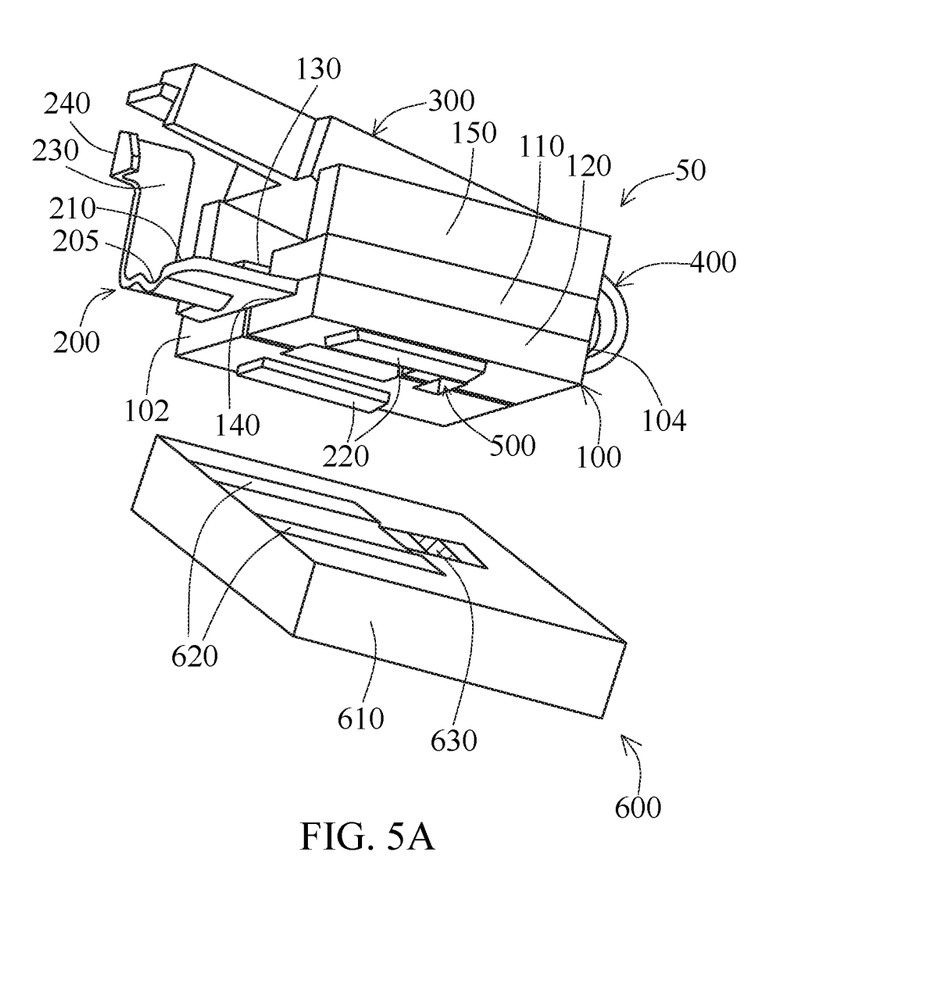
FIG. 5A is a schematic diagram of integrating a connection seat onto a circuit board according to an embodiment of this disclosure.

As shown in FIG. 5A, the circuit board 600 to be integrated with the connection seat 50 includes at least a substrate 610, a grounding pad 620 formed on the substrate 610, and a signal transmission pad 630 formed on the substrate 610 and isolated from the grounding pad 620. A grounding end 220 of a pedestal 120 protruding out of a base 100 in the connection seat 50 is correspondingly welded to the grounding pad 620 on the circuit board 600. In addition, a through-hole 500 in the connection seat 50 is disposed in correspondence to the signal transmission pad 630 of the circuit board 600. In view of the above, the whole connection seat 50 is jointed to the circuit board 600 by welding the metal member 200 engaged with the base 100 to the circuit board 600, to form the connection structure 60 shown in FIG. 5B and FIG. 5C.

Figure 5B:
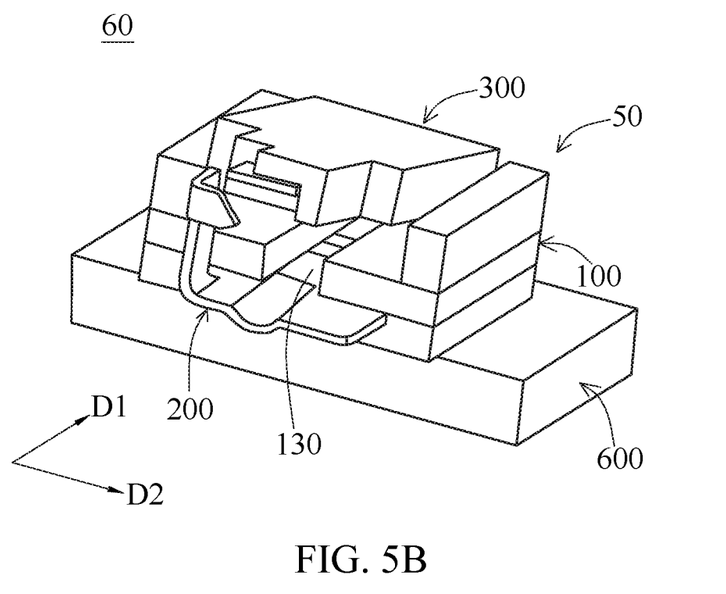
FIG. 5B and FIG. 5C are schematic diagrams of a connection structure including a connection seat integrated onto a circuit board according to an embodiment of this disclosure.
Figure 5C:
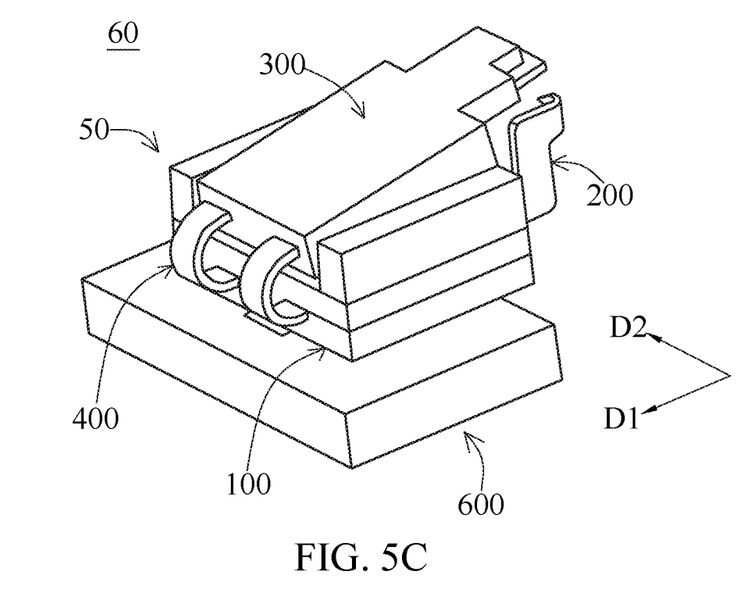

Specifically, referring to FIG. 5B and FIG. 5C together with FIG. 5A, the connection structure 60 includes the circuit board 600 and the connection seat 50. The connection seat 50 is welded to the grounding pad 620 of the circuit board 600 through at least one grounding end 220. By means of the foregoing structure, a coaxial cable may be mounted to the connection structure 60 by extending into the first trench 130 of the base 100 of the connection seat 50, and when the coaxial cable is clamped by the press cover 300 relatively covering the base 100 and the base 100, and a protruding portion (not shown) of the press cover 300 presses a central conductor of the coaxial cable. In this way, the central conductor protrudes to get in contact with and be electrically connected to the signal transmission pad 630 through the through-hole 500 (a detailed process is described below). Therefore, a signal may be input or output on the signal transmission pad 630 through the coaxial cable.

Figure 6:
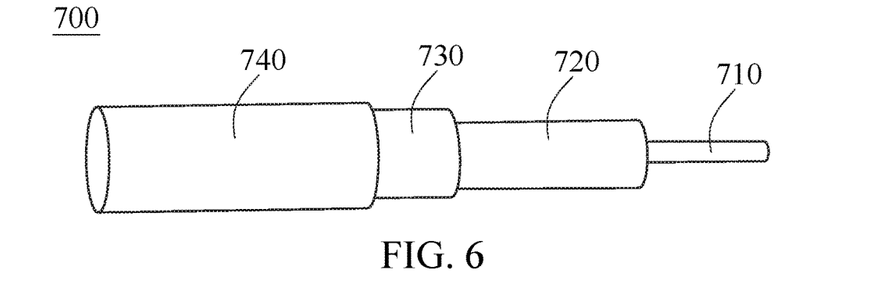
FIG. 6 is a schematic diagram of a layered structure of a coaxial cable according to an embodiment of this disclosure.

Specifically, referring to FIG. 6, according to an embodiment of this disclosure, a connectable coaxial cable 700 for transmitting a signal includes a central conductor 710 as a core, an insulator 720 wrapped around the central conductor 710, a mesh conductor 730 wrapped around the insulator 720, and an insulation protection sleeve 740 wrapped around the mesh conductor 730. However, the coaxial cable 700 described herein is merely illustrative, and another coaxial cable may also be connected to the connection seat or connection structure of this disclosure. In addition, this disclosure is not limited thereto.

Figure 7A:
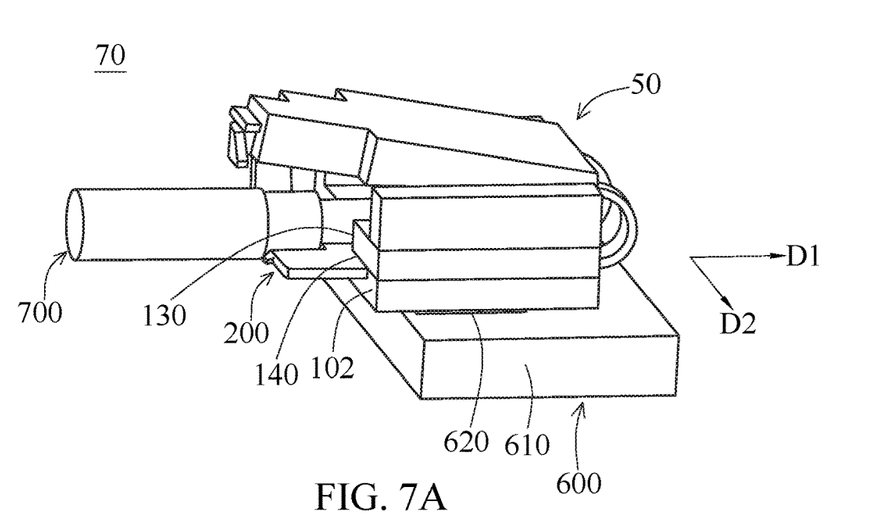
FIG. 7A and FIG. 7B are schematic diagrams of a connection structure including a connection seat to be inserted by a coaxial cable on a circuit board according to an embodiment of this disclosure.
Figure 7B:
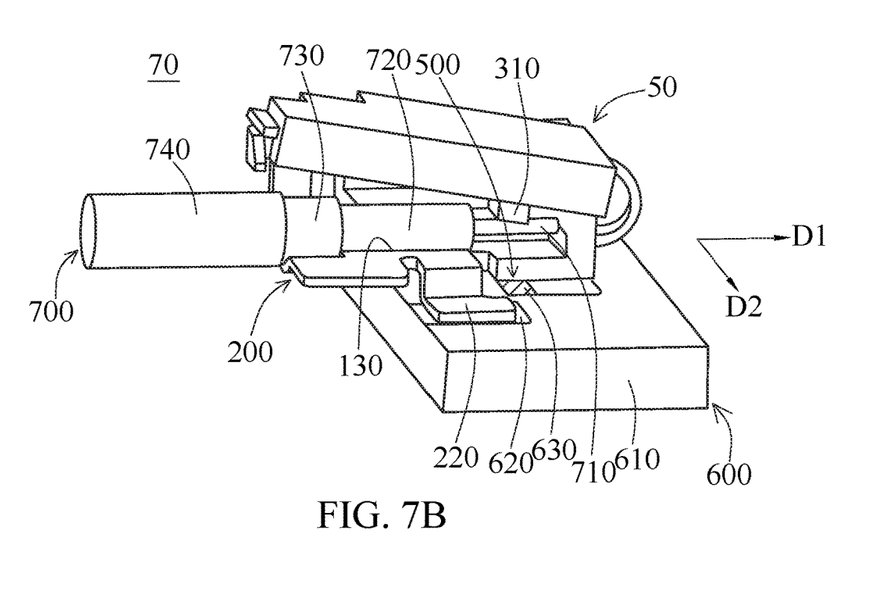

In view of the above, for example, when the coaxial cable 700 shown in FIG. 6 is inserted into the connection structures 60 shown in FIG. 5B and FIG. 5C, connection structures 70 shown in FIG. 7A and FIG. 7B can be formed. FIG. 7A is a top view of the connection structure 70 connected to the coaxial cable 700, and FIG. 7B is a schematic diagram of removing a partial structure of a base 100 relatively shielding the coaxial cable 700 inserted into the connection structure 70 to facilitate observing an internal state.

As shown in FIG. 7A and FIG. 7B, the connection structure 70 includes a circuit board 600, a connection seat 50 welded to the circuit board 600 through at least one grounding end 220, and the coaxial cable 700 extending from a first lateral surface 102 along a first trench 130 into the connection seat 50 to be detachably mounted to the connection seat 50. According to some embodiments of this disclosure, when the first trench 130 is communication with a second trench 140 for inserting a metal member 200, the coaxial cable 700 is placed on the metal member 200. However, although there is no illustration in the figure, if the connection seat is the connection seat 20 shown in FIG. 2A, the coaxial cable 700 may be placed on a part of a top plate 110 of the base 100 without getting in contact with the metal member 200.

Herein, referring to FIG. 7B, a central conductor 710 inside at least one section of an endpoint of the coaxial cable 700 extending into the first trench 130 is exposed. For example, an insulation protection sleeve 740, a mesh conductor 730, and an insulator 720, on a periphery of at least one section starting from an endpoint of the coaxial cable 700, extending into the first trench 130 may be removed to expose the central conductor 710 inside, and another internal structure of the coaxial cable 700 may be exposed from the other part extending to the first trench 130. For example, the mesh conductor 730 or insulator 720 may be exposed from one or more sections of the coaxial cable 700 or may be not exposed, completely include all structures, and be wrapped by the insulation protection sleeve 740.

It should be noted that according to a preferred embodiment of this disclosure, when a section of the exposed central conductor 710 of the coaxial cable 700 corresponds to a through-hole 500 and a signal transmission pad 630, the central conductor 710 inside a section of the coaxial cable 700 in contact with the metal member 200 is at least wrapped by the insulator 720. For example, as shown in FIG. 7B, the coaxial cable 700 located on the metal member 200 is in contact with the metal member 200 through at least one of the insulator 720, the mesh conductor 730, or the insulation protection sleeve 740 wrapped around the central conductor 710. Hence, an avoidable short circuit or formation of another circuit caused by contact between the central conductor 710 for signal transmission and the metal member 200 can be avoided, and external electromagnetic waves or currents guided or shielded by the mesh conductor 730 or the like may be guided by the metal member 200 to a grounding pad 620 and the grounding end 220 of the metal member 200, so that signal transmission performed by using the coaxial cable 700 is more stable and noise-free.

Figure 8A:
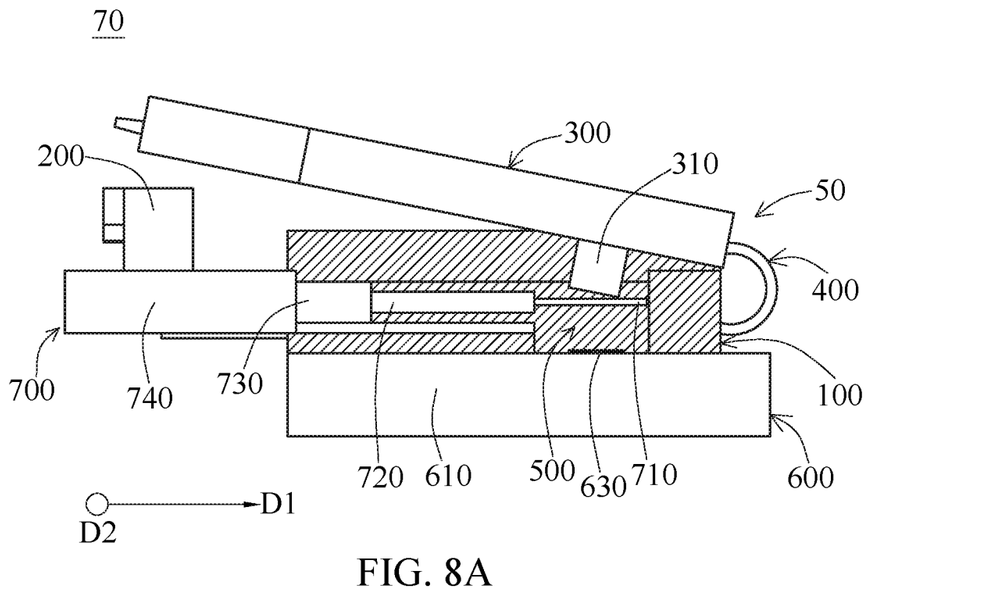
FIG. 8A and FIG. 8B are schematic cross-sectional views of a process in which a central conductor of a coaxial cable is pressed by a protruding portion to get in contact with a circuit board according to an embodiment of this disclosure.
Figure 8B:
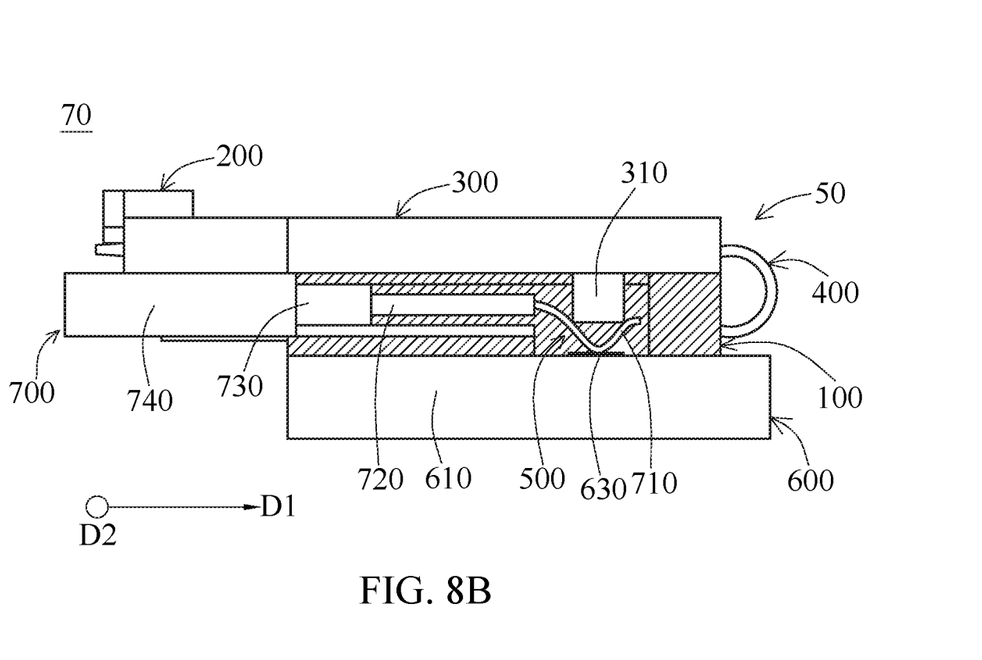

Simple schematic cross-sectional views of the foregoing connection structure 70 are shown in FIG. 8A and FIG. 8B. A part or a component that is not needed for description may be partially or entirely omitted, and proportions and relative proportions of the respective components shown in the drawings are adjusted or exaggerated for clear display.

In view of the above, referring to FIG. 8A, the central conductor 710 exposed from the coaxial cable 700 corresponds to the through-hole 500, and when the coaxial cable 700 as shown in FIG. 8B is clamped and positioned by the press cover 300 and the base 100. The protruding portion 310 of the press cover 300 presses the central conductor 710, to make the central conductor 710 in contact with the circuit board 600 through the through-hole 500, for example, the signal transmission pad 630 of the circuit board 600. Therefore, the connection seat 50 or the connection structure 70 may connect the central conductor 710 of the coaxial cable 700 to the circuit board 600 to implement an electric connection and signal transmission.

Subsequently, referring to FIG. 9A to FIG. 9C together with FIG. 3, a process in which the connection structure 70 secures the press cover 300 through the latch portion 240 according to an embodiment of this disclosure is further described in detail.

Figure 9A:
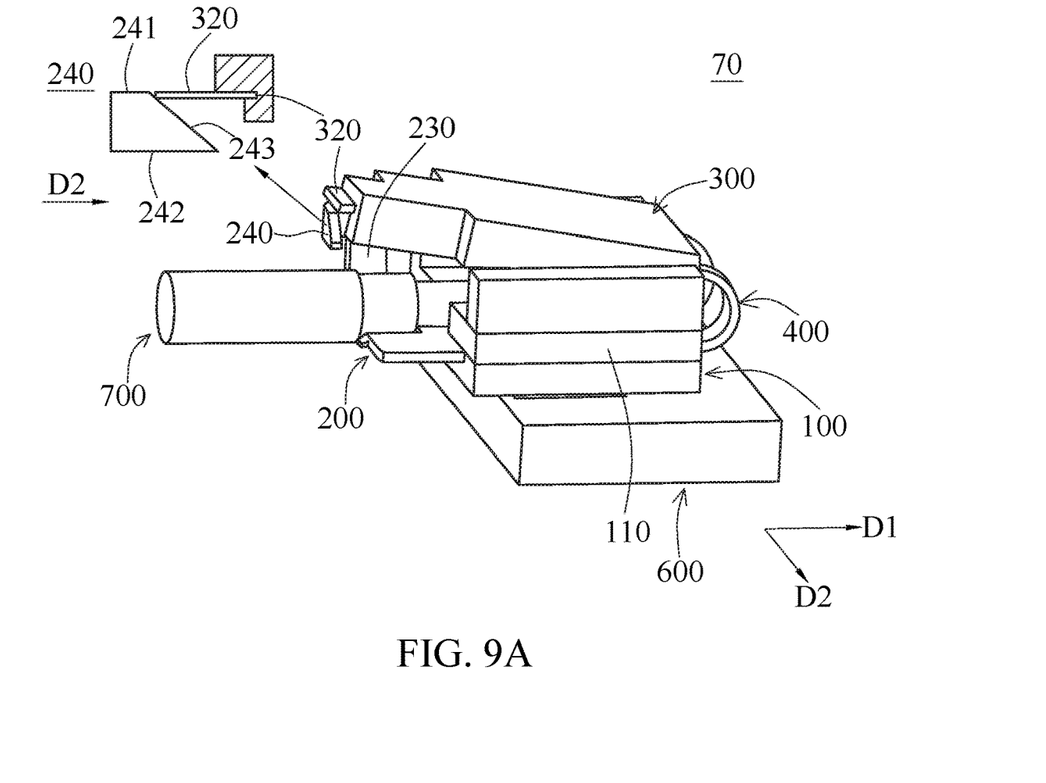
FIG. 9A and FIG. 9C are schematic diagrams of a process in which a connection seat secures a press cover through a latch portion according to an embodiment of this disclosure.
Figure 9B:
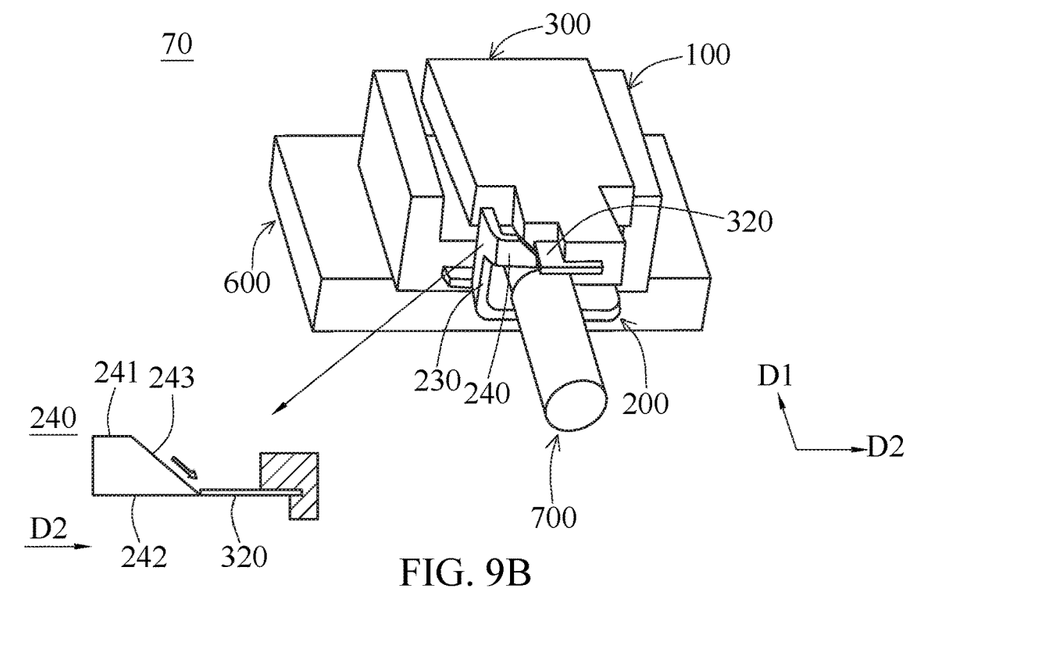
Figure 9C:
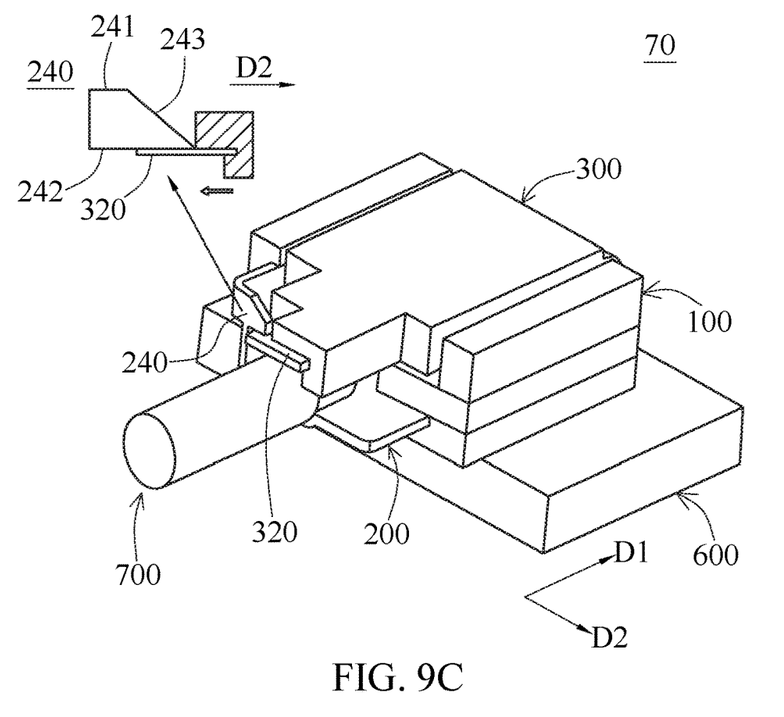

First, referring to FIG. 9A, as described above by referring to FIG. 3, when the concatenation portion 400 is bent by applying a force, to move the press cover 300 downward toward the top plate 110 of the base 100, at least one part, for example, a protruding block 320, of the press cover 300 may slide along a guide slope of the third bevel edge 243 toward the top plate 110. Referring to FIG. 8B, when the protruding block 320 moves from the first lateral edge 241 that is relatively short to the second lateral edge 242 that is relatively long on the third bevel edge 243, at least one part of the protruding block 320 or the press cover 300 has lateral deformation in the second direction D2 essentially parallel to the first lateral edge 241 and the second lateral edge 242. Therefore, referring to FIG. 9B together with FIG. 9C, when a part of the laterally deformed protruding block 320 or press cover 300 is continuously pressed to move to somewhere below a junction between the third bevel edge 243 and the second lateral edge 242, at least one part of the protruding block 320 or press cover 300 that deforms toward the second direction D2 recovers from deformation and rebounds toward a backward direction of the second direction D2 because it is not abutted against by the third bevel edge 243 of the latch portion 240, and moves to somewhere below the second lateral edge 242 as a downward force is applied, so as to be abutted against by the second lateral edge 242 from the top to the bottom. Hence, the press cover 300 may be abutted against by the latch portion 240 from the top to the bottom, to avoid the press cover 300 from being loosened from the base 100.

Figure 10:
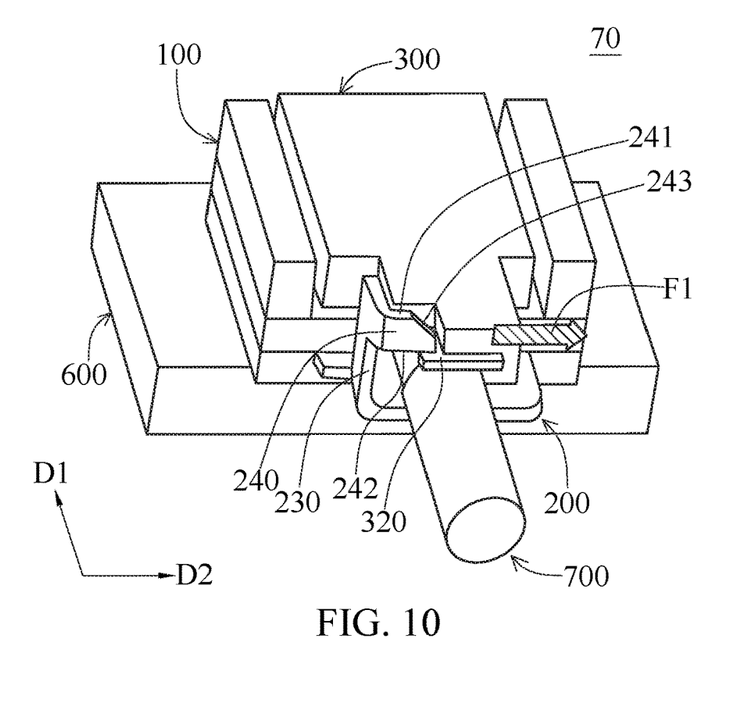
FIG. 10 is a schematic diagram of detaching a press cover from a latch portion according to an embodiment of this disclosure.

Correspondingly, referring to FIG. 10, when it is expected that the press cover 300 is moved from the top of the base 100, a force F1 may be applied to move at least one part of the protruding block 320 or press cover 300 toward the forward direction of the second direction D2 to the third bevel edge 243. Hence, when being not pressed downward by a force, at least one part of the deformed protruding block 320 or press cover 300 may recover its original shape as the third bevel edge 243 slides toward the backward direction of the second direction D2 from the bottom the top, thereby loosening the press cover 300, so as to reassemble or disassemble the coaxial cable 700 inside. In view of the above, this process is a reverse procedure of FIG. 9A to FIG. 9C. Same or similar details are not described herein again. In addition, all specific actions of the latch portion 240 described herein are merely illustrative. A person of ordinary skill in the art should know that the press cover 300 may be clamped by using a latch portion 240 in another form according to this disclosure. In view of the above, this disclosure is not limited to the foregoing examples described in detail.

In conclusion, according to this disclosure, connection and signal transmission of the coaxial cable may be implemented by using the integrated connection seat or connection structure. Therefore, it does not need to first assembly the coaxial cable and the joint and then, fasten the joint to, for example, the joint seat on the circuit board to implement connection, and a defect that the coaxial cable is loosened from the joint caused by repeatedly fastening, unfastening, and assembling the joint and joint seat, can reduced. Therefore, stability and reliability in connection of a coaxial cable can be improved, a quantity of times of dissembling and assembling the coaxial cable can be increased, and a service life of the coaxial cable is prolonged.

Only some preferred embodiments of this disclosure are described above. It should be noted that various variations and modifications may be made to this disclosure without departing from the spirit or principle of this disclosure. A person ordinary skill in the art should know that this disclosure is defined by the attached claims, and on the premise of conforming to the intention of this disclosure, none of the various possible changes, such as replacements, combinations, modifications, and transformations, exceeds the scope defined by the attached claims of this disclosure.

What is claimed is:

1. A connection seat for connecting a coaxial cable, applied to the coaxial cable, and comprising:
    a base, having a top plate, a first trench located on the top plate and extending along a first direction, a second trench below the top plate, a pedestal below the second trench and connected to the top plate, and a through-hole running through the top plate and the pedestal, the first trench and the second trench respectively extending to a first lateral surface of the base for enabling the coaxial cable to extend from the first lateral surface into the base along the first trench to be detachably mounted to the base;
    a metal member, having a body and at least one grounding end, at least one part of the body extending from the first lateral surface into the second trench to engage the metal member with the base, and the at least one grounding end extends out of the pedestal from the body;
    a press cover, having a protruding portion; and
    a concatenation portion, being flexible and connecting the base and the press cover; wherein when the concatenation portion is bent such that the press cover covers the top plate of the base, the protruding portion correspondingly protrudes toward the through-hole.

2. The connection seat for connecting a coaxial cable according to claim 1, wherein the metal member further comprises a first extending portion protruding from the body and oppositely directed to the at least one grounding end, and a latch portion protruding from the first extending portion, and when the press cover covers the top plate of the base, the latch portion latches the press cover.

3. The connection seat for connecting a coaxial cable according to claim 2, wherein the latch portion comprises a first lateral edge oppositely directed to the body, a second lateral edge facing the body, and a third bevel edge connecting the first lateral edge and the second lateral edge, wherein a length of the second lateral edge is greater than a length of the first lateral edge.

4. The connection seat for connecting a coaxial cable according to claim 3, wherein when the concatenation portion is bent such that the press cover covers the top plate of the base, the at least one part of the press cover slides toward the top plate along the third bevel edge to deform the press cover, and the press cover recovers from deformation at a junction between the third bevel edge and the second lateral edge, to enable the at least one part of the press cover to move to a position below the second lateral edge, so as to be abutted against by the second lateral edge.

5. The connection seat for connecting a coaxial cable according to claim 4, wherein the press cover is made of a material having a flexibility greater than the flexibility of the metal member.

6. The connection seat for connecting a coaxial cable according to claim 1, wherein the base further comprises at least one positioning lateral walls protruding and extending from the top plate and oppositely directed to the second trench, and the at least one positioning lateral walls are abutted against and position the press cover when the press cover covers the top plate of the base.

7. The connection seat for connecting a coaxial cable according to claim 1, wherein the concatenation portion, the press cover, and the base are integrally formed and made of a same material, and the concatenation portion has a thickness less than those of the press cover and the base.

8. The connection seat for connecting a coaxial cable according to claim 1, wherein the concatenation portion, the press cover, and the base are made of plastic.

9. The connection seat for connecting a coaxial cable according to claim 1, wherein the body of the metal member further comprises a groove outside the second trench, and the groove extends along the first direction and corresponds to the first trench.

10. A connection structure for connecting a coaxial cable, comprising:
    a circuit board; and
    the connection seat according to claim 1, wherein the connection seat is welded to the circuit board through the at least one grounding end.

11. The connection structure for connecting a coaxial cable according to claim 10, wherein the metal member further comprises a first extending portion protruding from the body and oppositely directed to the at least one grounding end, and a latch portion protruding from the first extending portion, and when the press cover covers the top plate of the base, the latch portion latches the press cover.

12. The connection structure for connecting a coaxial cable according to claim 11, wherein the latch portion comprises a first lateral edge oppositely directed to the body, a second lateral edge facing the body, and a third bevel edge connecting the first lateral edge and the second lateral edge, wherein a length of the second lateral edge is greater than a length of the first lateral edge.

13. The connection structure for connecting a coaxial cable according to claim 10, wherein the base further comprises at least one positioning lateral walls protruding and extending from the top plate and oppositely directed to the second trench, and the at least one positioning lateral walls are abutted against and position the press cover when the press cover covers the top plate of the base.

14. The connection structure for connecting a coaxial cable according to claim 10, wherein the concatenation portion, the press cover, and the base are integrally formed, and the concatenation portion has a thickness less than those of the press cover and the base.

15. A connection structure, comprising:
    a circuit board;
    the connection seat according to claim 1, wherein the connection seat is welded to the circuit board through the at least one grounding end; and
    a coaxial cable, extending from the first lateral surface into the connection seat along the first trench, to be detachably mounted to the connection seat, wherein
    a central conductor inside at least one section of an endpoint of the coaxial cable extending into the first trench is exposed, and when the coaxial cable is clamped and positioned by the press cover and the base, and the protruding portion presses the central conductor, such that the central conductor in contact with the circuit board through the through-hole.

16. The connection structure according to claim 15, wherein the coaxial cable comprises the central conductor having a core, an insulator wrapped around the central conductor, a mesh conductor wrapped around the insulator, and an insulation protection sleeve wrapped around the mesh conductor, wherein when the at least one section of the central conductor of the coaxial cable exposed and is in contact with the circuit board through the through-hole, and the central conductor of the coaxial cable in contact with the metal member is wrapped by at least the insulator, so that the coaxial cable is in contact with the metal member through at least one of the insulator, the mesh conductor, or the insulation protection sleeve.

17. The connection structure according to claim 15 wherein the metal member further comprises a first extending portion protruding from the body and oppositely directed to the at least one grounding end, and a latch portion protruding from the first extending portion, and when the press cover covers the top plate of the base, the latch portion latches the press cover.

18. The connection structure according to claim 17, wherein the latch portion comprises a first lateral edge oppositely directed to the body, a second lateral edge facing the body, and a third bevel edge connecting the first lateral edge and the second lateral edge, wherein a length of the second lateral edge is greater than a length of the first lateral edge.

19. The connection structure according to claim 15, wherein the base further comprises at least one positioning lateral walls protruding and extending from the top plate and oppositely directed to the second trench, and the at least one positioning lateral walls are abutted against and position the press cover when the press cover covers the top plate of the base.

20. The connection structure according to claim 15, wherein the concatenation portion, the press cover, and the base are integrally formed, and the concatenation portion has a thickness less than those of the press cover and the base.

* * * * *